(12) United States Patent
Dyke et al.

(10) Patent No.: US 8,361,583 B2
(45) Date of Patent: Jan. 29, 2013

(54) RESISTIVE IMPLANT WELDING FOR ADHESIVE CURING FOR THERMOPLASTIC AND THERMOSET APPLICATIONS

(75) Inventors: David Scott Dyke, Harrison Township, MI (US); Jeremy Alan Panasiewicz, Macomb, MI (US); Steven Grgac, Mississauga (CA)

(73) Assignee: Magna International Inc., Aurora (CA)

( * ) Notice: Subject to any disclaimer, the term of this patent is extended or adjusted under 35 U.S.C. 154(b) by 328 days.

(21) Appl. No.: 12/660,481

(22) Filed: Feb. 26, 2010

(65) Prior Publication Data
US 2011/0212331 A1    Sep. 1, 2011

(51) Int. Cl.
B32B 7/12    (2006.01)
B32B 7/04    (2006.01)
B29C 65/34    (2006.01)
B29C 65/52    (2006.01)
B62D 27/00    (2006.01)

(52) U.S. Cl. ............... 428/57; 428/53; 428/58; 428/61; 428/411.1; 428/414; 428/423.1; 428/426; 428/457; 428/492; 428/500; 428/537.1

(58) Field of Classification Search ............... 428/57, 428/53, 58, 61, 411.1, 414, 423.1, 426, 457, 428/492, 500, 537.1
See application file for complete search history.

(56) References Cited

U.S. PATENT DOCUMENTS

| 5,225,025 A | 7/1993 | Lambing et al. |
| 5,313,034 A | 5/1994 | Grimm et al. |
| 5,375,889 A | 12/1994 | Nakashiba et al. |
| 5,389,184 A | 2/1995 | Jacaruso et al. |
| 5,407,514 A | 4/1995 | Butts et al. |
| 5,407,520 A | 4/1995 | Butts et al. |
| 5,475,203 A | 12/1995 | McGaffigan |
| 5,643,390 A | 7/1997 | Don et al. |
| 2005/0184053 A1 | 8/2005 | Wilkinson et al. |
| 2008/0152919 A1 | 6/2008 | Grgac et al. |

FOREIGN PATENT DOCUMENTS

| EP | 0 440 410 A2 | 8/1991 |
| GB | 1 315 373 A | 5/1973 |
| GB | 1315373 A * | 5/1973 |
| JP | 59 081373 A | 5/1984 |
| WO | WO 2007/016152 | 2/2007 |
| WO | WO 2007/101334 | 9/2007 |

* cited by examiner

Primary Examiner — Brent O'Hern
(74) Attorney, Agent, or Firm — Warn Partners, P.C.; Marc Luddy

(57) ABSTRACT

A welded joint for structural component having two or more portions fused together at a weld line. An adhesive layer is placed between the two or more portions at the location of the weld line and a conductor is placed between the two or more portions in operable contact with the adhesive. Energy is transmitted through the conductor and into the adhesive layer to activate the adhesive layer and create the weld line that defines the welded joints between the two or more portions. The welded joint of the structural component allows energy to be injected into the adhesive layer via the conductor in order to cause the adhesive layer to activate from the inside of the adhesive outward. The conductor can be placed adjacent the adhesive layer or within the adhesive layer in order to cause the adhesive to be activated from the inside outward.

6 Claims, 5 Drawing Sheets

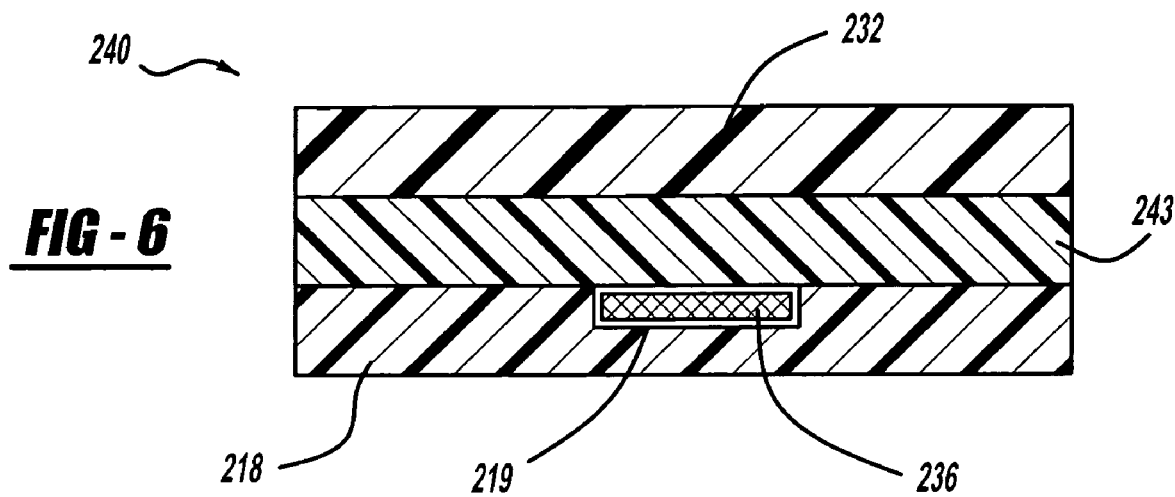
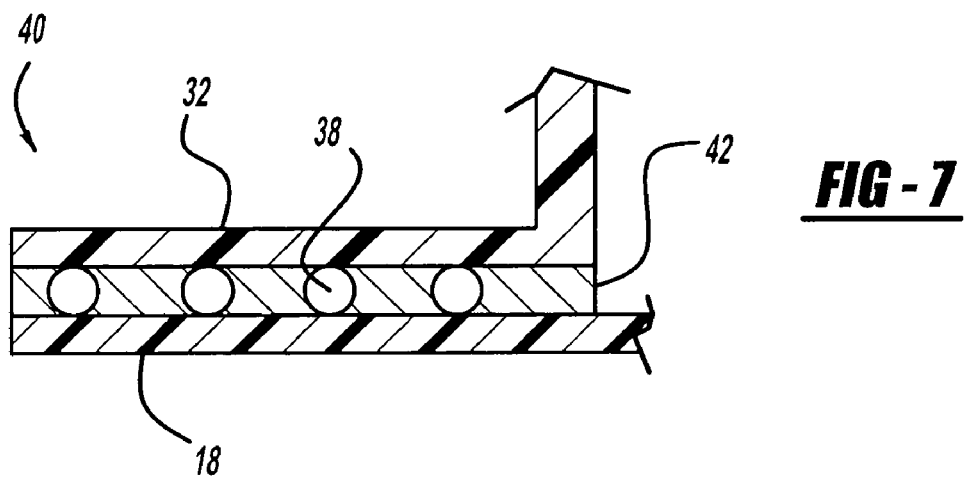
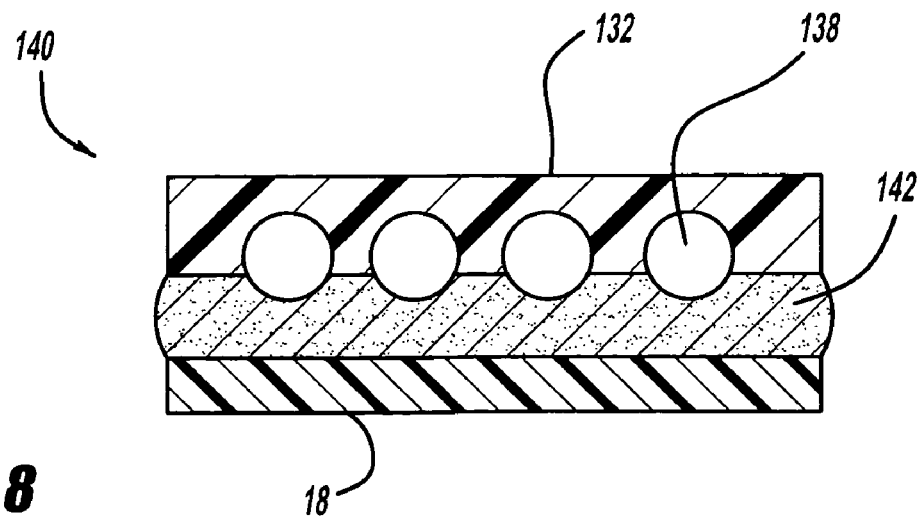

RESISTIVE IMPLANT WELDING FOR ADHESIVE CURING FOR THERMOPLASTIC AND THERMOSET APPLICATIONS

FIELD OF THE INVENTION

The present invention relates to a hybrid resistive implant welding (RIW) adhesive technique for forming structural welds in structural applications.

BACKGROUND OF THE INVENTION

Welding together two or more components in structural applications is a common occurrence that requires the weld line to have a substantial amount of strength. Typically the components being welded together are made from the same materials; however, with the increase in the use of plastics in manufacturing, often different types of plastics and/or metals or other materials are welded together forming a joint. In order to form strong joints, traditional adhesive bonding systems have been used. Traditional adhesive bonding systems involve placing an adhesive between the two components that are to be welded together and then heating the adhesive area to cause the adhesive to activate and form a joint between the two parts. Heat activated adhesives are traditionally activated by heating the area of the adhesive and weld line area from the outside inward using hot air or steam. Some adhesive systems have been developed that rely on microwave or UV light in order to put enough energy into the adhesive to activate the adhesive and form a welded joint. All of these systems require a large amount of heat, fixtures for manufacturing and requires significant amounts of time in order to form joints.

One particular system for welding of thermoplastic components involves what is commonly referred to as resistive implant welding (RIW). RIW involves placing a conductor, sometimes a metal conductor, between two thermoplastic components being welded together. The conductor is then heated causing the surface of each of the thermoplastic components to melt together to form a weld line at the joint. RIW technology has been used for forming welds between thermoplastic components. Conventional RIW technology has never been used to form welds between components that are not capable of melting together. There is a need to develop a hybrid RIW adhesive system that allows energy to be introduced into the adhesive from the inside out and allows for energy to be localized within the weld line. Additionally, it is advantageous to develop a RIW adhesive system that allows for two components being made of thermoplastic, thermoset, metal, glass, wood or virtually any other type of material and combinations thereof to effectively bond together two components and achieve a high degree of weld strength.

There further exists a need to develop adhesive systems that require less energy, fixtures and can still use traditional adhesive compounds. It is also desirable to develop an adhesive system that can be used in a variety of structural applications that include, but are not limited to, the forming of automotive components such as tailgates, doors, hoods, lids, semi-truck components including sleeper cab assemblies, marine and rail car applications that include the forming floor components, trailer floor components, heating and cooling trays for homes, and other housing applications such as doors and plumbing components including showers, sinks, wash basins, etc.

SUMMARY OF THE INVENTION

A structural component having a welded joint, where the structural component has two or more portions that are fused together at a weld line of the welded joint. An adhesive layer is placed between the two or more portions at the location of the weld line and a conductor is placed between the two or more portions in operable contact with the adhesive. Energy is transmitted through the conductor and into the adhesive layer to activate the adhesive layer and create the weld line that defines the welded joints between the two or more portions. The welded joint of the structural component allows energy to be injected into the adhesive layer via the conductor in order to cause the adhesive layer to activate from the inside of the adhesive outward. The conductor can be placed adjacent the adhesive layer or within the adhesive layer in order to cause the adhesive to be activated from the inside outward. This decreases the amount of process time and saves a substantial amount of energy needed to create the welded joint that would otherwise be required using traditional adhesive welding systems.

The formation of the structural components in accordance with the present invention can be used for variety of different applications. The present invention can be used for forming welded joints between two portions of either similar or different materials. Materials include, but are not limited to, plastics including thermoplastics and thermosets, metals including alloys, glass, wood, and carpet and fiber board. The more specific types of applications for the structural components include, but are not limited to, automotive applications such as tailgates, doors, lids, hoods, semi-truck cabins, semi-truck exterior components, composite front end modules in vehicle frames or radiators or other metallic components connected to composite front end modules. Other non-automotive applications include, but are not limited to, marine applications such as boat floors, railroad applications including rail car floors and trailering applications such as trailer floors. Additionally, the structural components formed in the present invention could also include applications in the construction industry including, but not limited to, doors and heating and cooling applications.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a magnified cross-sectional plan view of a welded joint;

FIG. 7 is a magnified cross-sectional plan view of an alternate embodiment of the welded joint; and FIG. 8 is a exploded cross-sectional view of an alternate embodiment of the welded joint incorporating a groove for placement of the conductor.

DETAILED DESCRIPTION OF THE PREFERRED EMBODIMENTS

The following description of the preferred embodiment(s) is merely exemplary in nature and is in no way intended to limit the invention, its application, or uses.

Referring now to FIGS. 1-2, 4 and 5 a method for forming a welded component using a hybrid resistive implant welding adhesive system. A structural component 10 is shown in the welding machine 12. The welding machine 12 has an upper platen 14 capable of moving vertically with respect to the structural component 10. The welding machine 12 also has a lower platen 16 upon which the structural component 10 rests. When the structural component 10 is to be welded the upper platen 14 will move vertically and press down against the structural component 10 and apply pressure. While the present exemplary embodiment of the invention describes the use of an upper platen 14 and lower platen 16, it is possible to reduce the number of fixtures required for forming the structural component 10 by eliminating the upper platen 14 and lower platen 16 and using simple clamps for applying pressure on the component during the welding process. This allows for the welding machine 12 to be used for several different applications and not specifically for a particular component.

Figure 1:
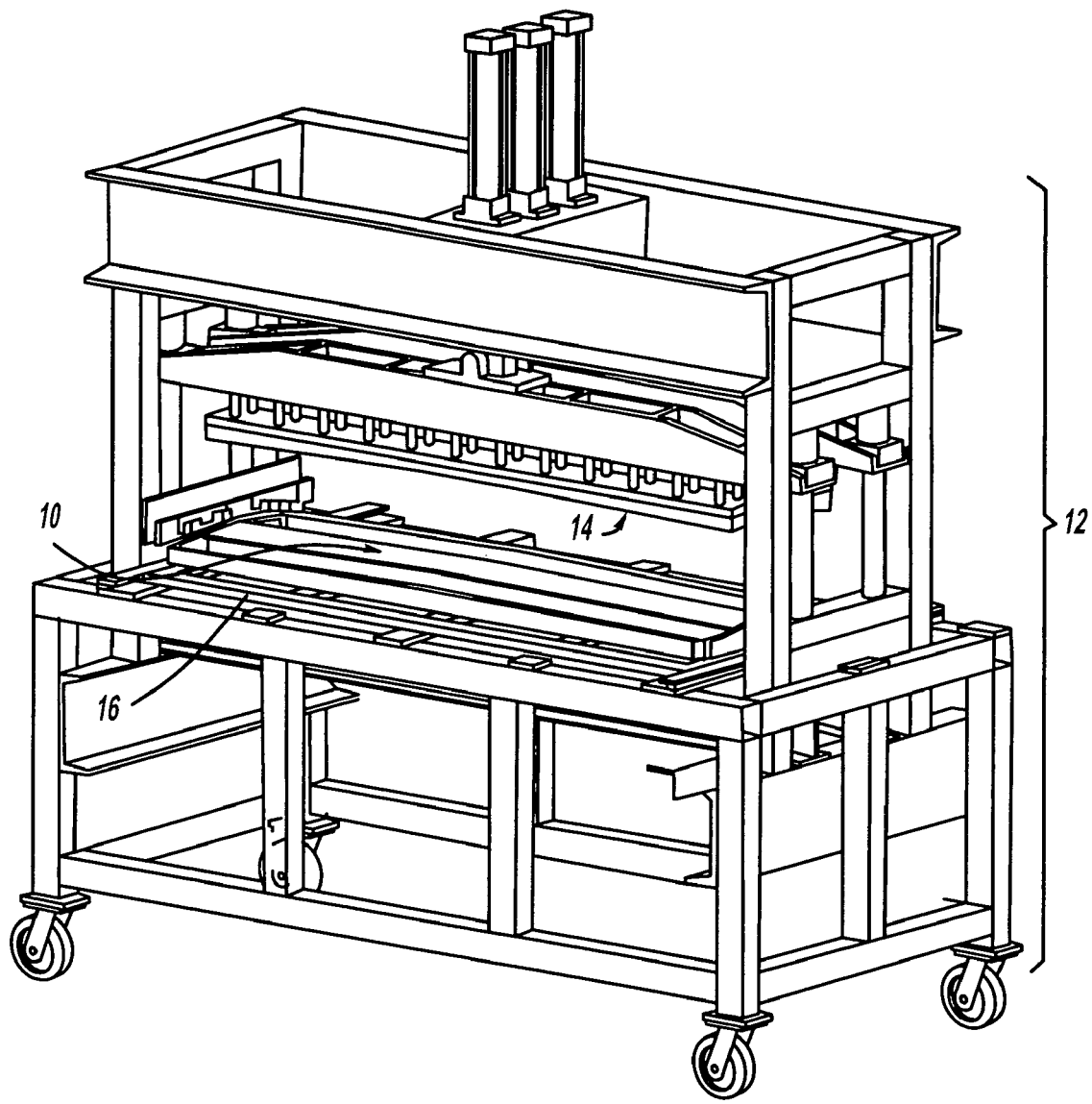
FIG. 1 is a perspective view of an exemplarily welding machine.
Figure 2:
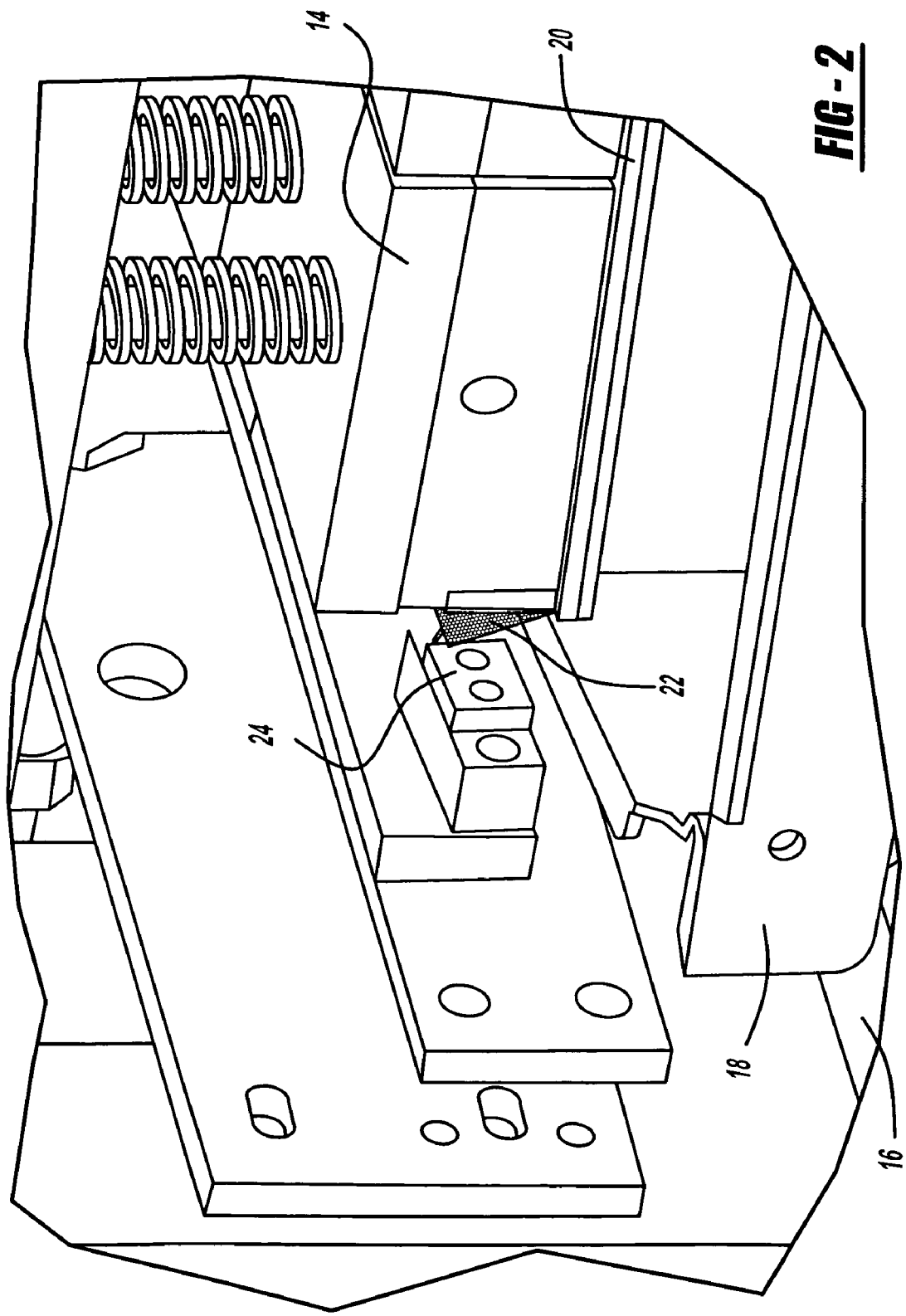
FIG. 2 is a perspective close up view of a structural component being formed in the welding machine.

FIG. 2 shows a close up view wherein the upper platen 14 is pressed down against the structural component 10. The structural component 10 has a first portion 18, a second portion 20 and a conductor 22 placed between the first portion 18 and the second portion 20. The first portion 18 and second portion 20 can take many shapes and forms depending upon the particular application of the invention. This will be discussed in greater detail with reference to FIGS. 4-5.

The conductor 22 comes into contact with an energy source 24 which can be copper contacts or conductors that energize the conductor 22. The conductor 22 can be wire mesh or some other type of electrically conductive material capable of generating heat when an electrical current is applied. While the conductor 22 is described as being wire mesh, it is within the scope of this invention for the conductor 22 to be a single wire capable of conducting energy in the form of heat. The conductor is used to put energy (e.g. heat) into the adhesive layer described in FIGS. 4-5, from the interior of the layer outward. This is in contrast to traditional adhesive systems which rely on trying to heat the adhesive layer from the outside inward. Suitable wire materials include, but are not limited to, metals including aluminum, steel, nickel and other conductive materials such as carbon fiber.

Figure 4:
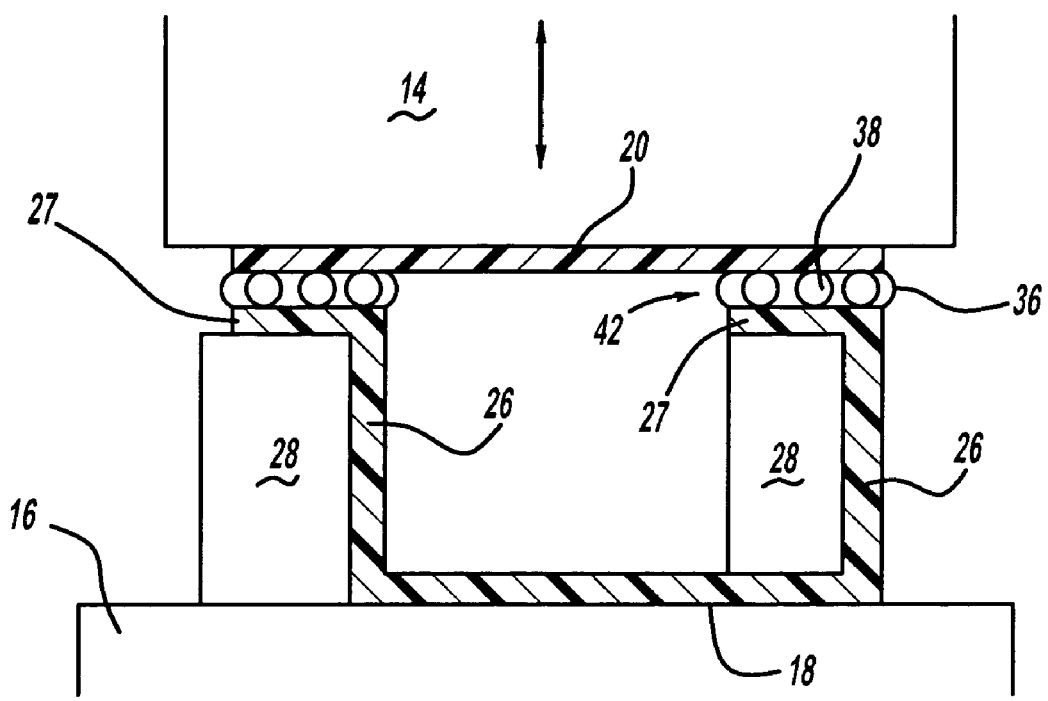
FIG. 4 is a cross-sectional view of a first component being welded to a second component.
Figure 5:
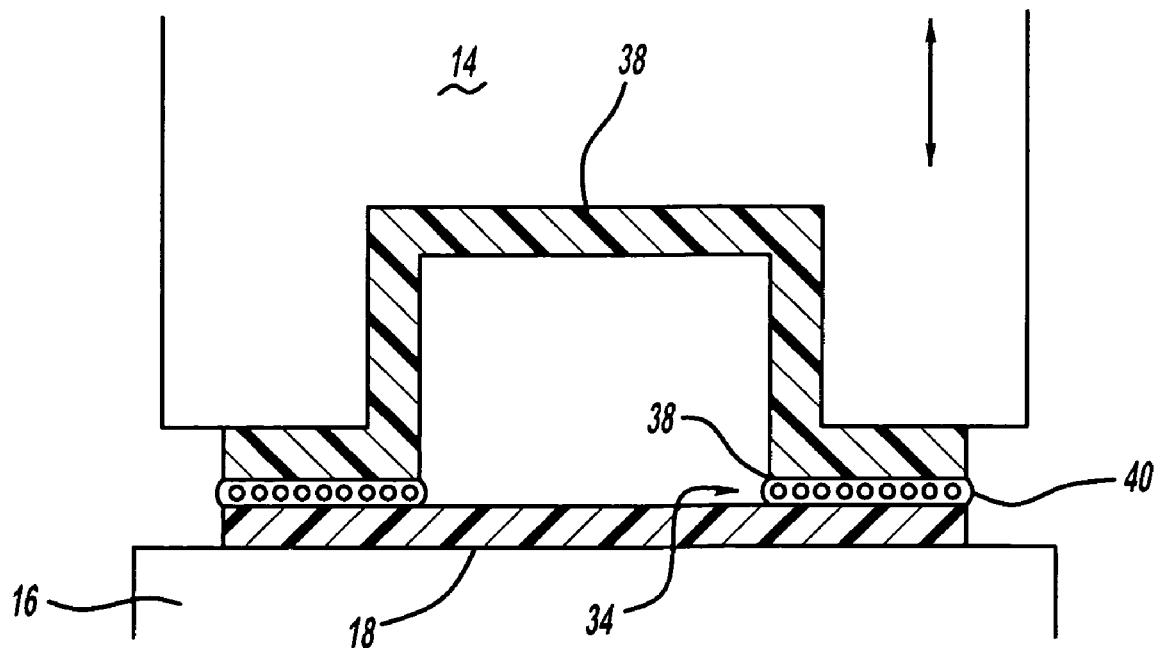
FIG. 5 is a plan side view of a first component being welded to a second component.

Referring also to FIGS. 4-5, the method of forming a welded joint in a structural component is described. The term welded joint as used herein describes the overall connection between the two portions of the structural component. Encompassed within the welded joint is a weld line, which is the location of the physical connection between the two portions, which includes the solidified adhesive layer as well as any fused together thermoplastic materials that may melt together within the area of the weld line, in instances where one or both portions are plastic materials that melt in an area that contacts the conductor. The term welded joint also is inclusive of the area of the portions at the point of the weld, the adhesive layer and the conductor. The weld line includes the area that solidifies upon curing of the component. This can include, but is not limited to, the curing of the adhesive layer as well as any melted plastic components that are fused together.

The upper platen 14 moves down and compresses causing the first portion 18 to apply force to the second portion 20. The energy source 24 applies energy to the conductor 22 which causes the conductor to heat up. An adhesive layer 36 is positioned between the first portion 18 and second portion 20. The adhesive layer 36 can be applied to a surface on either the first portion 18 or second portion 20. Additionally, it is possible for adhesive to be applied on both the first portion 18 and the second portion 20. The conductor 22 is placed through the adhesive layer 34 and begins to heat up when energy is applied to the conductor 22 by the energy source 24. The conductor 22 can be placed through the adhesive layer 36 prior to the adhesive layer 36 being applied to the first portion 18 or second portion 20. Additionally, it is possible for the conductor to be placed on either the first portion 18 or second portion 20 and then the adhesive layer 36 is applied over the conductor 22 so that when the upper platen 14 applies pressure, the conductor 22 will be pressed into the adhesive layer 36. In other applications, the adhesive layer 36 and conductor may remain separate and the conductor 22 will apply heat across the adhesive layer 36. The heating of the conductor 22 causes a welded joint 40 to be formed at a weld line 42 by activating the adhesive layer 36 to bond the first portion 18 and second portion 20 together at the weld line 42 to create a welded joint of the structural component 10. The pressure applied by the platens 14, 16 exerts force on the portions 18 and 20 causes the adhesive to flow around the conductor 22 and bond the first portion 18, second portion 20 and the conductor 22 together at the weld line 42.

After the pressing and energizing operation has occurred for a predetermined time period the first portion 18 and second portion 20 will be allowed to cure and form the weld line 42. The conductor 22 will remain in the structural component 10 at the weld line; however, it is possible for the conductor 22 to be removed from the adhesive layer 36 prior to complete curing of the welded joint 40. The weld line 42 formed between the first portion 18 and second portion 20 will have a high weld strength, that has been shown to be equal or greater than the type of weld strength obtained using adhesives or mechanical fasteners. Furthermore, the manufacturing time for forming the weld between the first portion 18 and second portion 20 is much shorter than the manufacturing time forming a similar weld using traditional adhesive systems. Additionally, use of the RIW technique and the adhesive system allows for a more thorough heating of the adhesive layer and provides an energy savings between about 10% to about 70% over conventional adhesive systems because the heat is being applied from within the adhesive layer via the conductor 22. Furthermore, traditional adhesive systems use steam, which needs to be stored and kept at a sufficient temperature before application. The present invention lowers the amount of energy needed by eliminating the need to maintain heat (e.g. steam) within the system.

Figure 3:
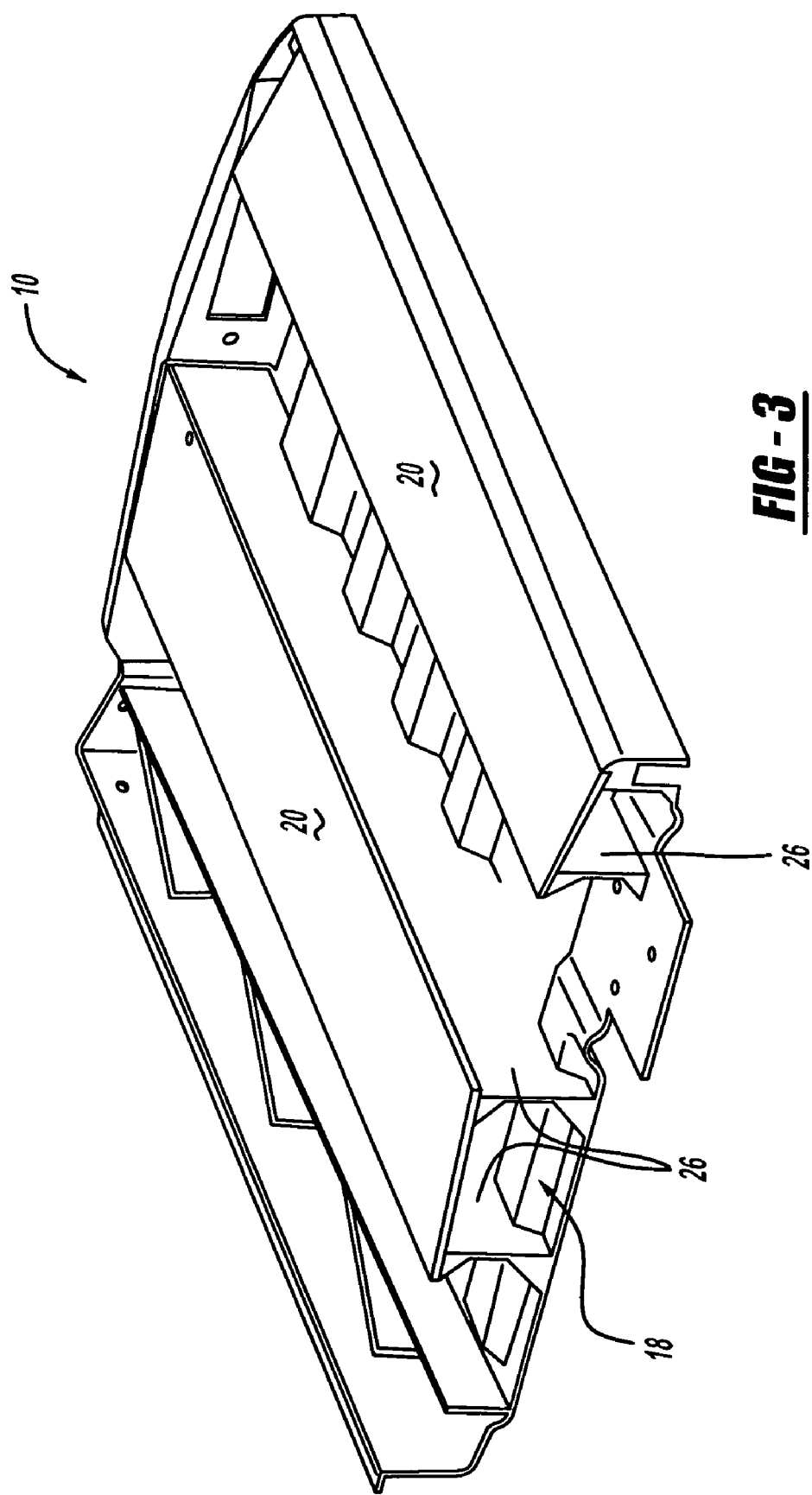
FIG. 3 is a perspective view of a structural component formed as one half of a vehicle tailgate.

Referring to FIG. 3 a view of a moulded tailgate is shown wherein the first portion 18 is the moulded tailgate portion and the second portion 20 is a reinforcement sheet that strengthens the structural component 10. The first portion 18 has tailgate flanges 26 extending from the first portion 18. The second portion 20 or reinforcement sheet is placed across one or more of the tailgate flanges 26. The conductor (not shown) is placed along the contact area between the tailgate flanges 26 and the second portion 20. The weld line 42 is formed along the length of the surface area of the conductor 22. The placement of the reinforcement sheet strengthens the structural component. For example, a tailgate as moulded in a manner described with respect to the present application can withstand loads greater or less than 2,200 lbs. However, 2,200 lbs. is merely exemplary number and depending on the specification the load can be greater or lesser.

Referring now to FIG. 4 a cross-sectional view of a portion of the tailgate shown in FIG. 3 is shown. The first portion 18 is a moulded tailgate portion having tailgate flanges 26 extending upward from the surface. The second portion 20 is welded onto the first portion 18. The upper platen 14 is shown and applies pressure toward the lower platen 16 during the welding process. In this particular application rigid supports 28 are inserted under L-shaped weld portions 27 of the tailgate flanges 26 in order to facilitate and even the weld of the first portion 18 to the second portion 20. The rigid supports 28 can be removed after the welding process is complete or left as solid supports. Alternatively, a welded joint can be created between the rigid support 28 and the L-shaped weld portions 27 in instances where these supports 28 are to remain. This weld would be in addition to the weld between the first portion 18 and the second portion 20. Disposed on the surface of the L-shaped weld portion 27 is a first adhesive layer 34. A second adhesive layer 36 is attached to the corresponding surface of the second portion 20 where the weld is to be formed. A conductor 38 is placed between the first adhesive layer 34 and second adhesive layer 36 and when heated will cause a weld line 42 to be formed between the first portion 18 and second portion 20. This is accomplished by heating the conductor 38 to cause the adhesive layers 34, 36 to heat up and activate. Additionally, the adhesive layers 34 and 36 can be smaller so that the conductor 38 actually contacts the surface of the L-shaped weld portion 27 and second portion 20 so that the surface layers of these portions will melt together with the adhesive layers forming a weld line 42 that is created by the hybrid resistive implant welding process, using the conductor 38 as well as adhesive bonding by the adhesive layers 34, 36.

The amount of energy needed to form the weld line 42 is less than traditional RIW welding without adhesive layers because the adhesive layers 34, 36 can be activated with heat produced by the conductors 38 in order to form the weld line 42. The conductor 38 applies a more direct form of energy than traditional heating. Although the use of rigid supports 28 is described above, it is not necessary to use them in all applications. It is possible to form a weld without the use of rigid supports 28.

FIG. 5 shows an alternate embodiment of the invention wherein there are no tailgate flanges 26; instead a u-shaped second portion 32 is welded onto the first portion 18 which is a moulded tailgate. This particular embodiment eliminates the need for using rigid supports 28. The upper platen 14 is modified to fit around the u-shaped second portion 32 and apply pressure at the appropriate location where a weld line 34 between the first portion 18 and the u-shaped second portion 32 is desired. In this particular embodiment, an adhesive layer 40 is applied to either the first portion 18 or second portion 32. The conductor 38 is heated to activate adhesive layer 40 to cause a weld to be formed. Additionally, it is possible for the conductor 38 to contact the surface area of the first portion 18 and the second portion 32 in order to generate enough heat to melt a surface layer of each of these components to cause the weld line 34 to be created by the fusing together of the first portion 18 and the second portion 32 in addition to adhesively welded together by the adhesive layer 40. The method of creating the weld line 34 in FIG. 5 provides the same benefits and advantages as described above with respect to FIG. 4.

Referring to FIG. 6, an enlarged view of the welded joint 40 after curing is shown. The welded joint 40 includes portions of the first portion 18 and second portion 32 and the hardened adhesive layer or weld line 42. Within the weld line 42 is the conductor 38.

Referring now to FIGS. 7 and 8, there is shown alternate arrangements for the welded joint. FIG. 7 shows a welded joint 140 wherein the conductor 138 has been pre-molded into a second portion 132 so that the conductor 138 is located at or near the surface edge of one of the surfaces of the second portion 132. A weld line 142 has been formed by heating and curing an adhesive layer that has been heated by the conductor 138 to fuse together the second portion 132 with the first portion 18 in order to form the welded joint 140. FIG. 8 depicts another type of welded joint 240. In this particular embodiment, a first portion 218 has a groove 219 formed thereon. The groove 219 is configured to provide a location for receiving a conductor 238. A weld line 242 is formed by heating an adhesive layer using the conductor 238 and then curing the adhesive layer in to the weld line 242 in order to weld together a second portion 232 to the first portion 218 creating the welded joint 240. In this particular embodiment, the groove 219 can be located on either the first portion 218 or the second portion 232. Additionally, the conductor 238 is shown as being a single strand conductor; however, it is possible for multiple strands to be used depending on the needs of a particular application.

The embodiment disclosed in FIGS. 4 and 5 can be used in other applications besides forming tailgates; it is possible to form any type of structural plastic parts. For example, in both applications set forth in FIGS. 4 and 5, the first portion 18 can be a moulded liftgate, while the second portion 20 or U-Shaped second portion 32 can be a reinforcement sheet or a moulded reinforcement for a moulded liftgate. Another application involves the first portion 18 being a top half of a running board while the second portion 20 or U-Shaped second portion 32 can be the bottom half of a running board. In another application the first portion 18 can be one half of a roof rail while the second portion 20 or U-Shaped second portion 32 can be a second half of a roof rail. In yet another application of the present invention, the first portion 18 can be a carrier module for a vehicle front end, while the second portion 20 or U-Shaped second portion 32 can be a resistively implant welded support beam. The invention described above can also be used to form airbag deployment chutes to instrument panel toppers or for welding decorative appliqués or exterior skins to panels, running boards, liftgates or tailgates, thus eliminating the need for using fasteners. It is also within the scope of this invention for the first portion and second portion described in FIGS. 4-8 to be made of materials that include, but are not limited to, plastics, including thermoplastics and thermosets, metals including alloys, glass, wood and carpet and fiberboard. The first portion and second portion can also take many forms for specific types of applications for structural components and not necessarily just be portions of a tailgate. Specific structural applications include, but are not limited to, automotive applications such as doors, lids, hoods; semi-truck cabins, semi-truck exterior components; composite front end modules in vehicle frames or radiators, or other metallic components connected to composite parts. Other non-automotive applications include, but are not limited to, marine applications such as boat floors; railroad applications including rail car floors; and trailering applications such as trailer floors. Additionally, the structural components formed in the present invention could also include applications in the construction industry including, but not limited to, doors; and heating and cooling applications such as furnace and air conditioning walls as well as drain pans for these units.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A structural component forming a tailgate having a welded joint comprising:
    a first portion of a molded tailgate portion, said first portion having one or more tailgate flanges extending from said first portion and a second portion forming a reinforcement sheet placed across the one or more tailgate flanges;
    at least one weld line created along a surface area between the first portion and the second portion;
    an adhesive layer placed between each of said two or more portions at said weld line;
    a conductor placed between said two or more portions in operable contact with said adhesive layer at said weld line and energy is transmitted to said adhesive layer through said conductor to activate said adhesive layer and create a weld line defining said welded joint between said two or more portions along the surface area of said adhesive layer; and
    wherein a combined structure of the structural component including the first portion, the second portion, the one or more tailgate flanges and the weld line makes the combined structure of the structural component capable of withstanding forces equal to or greater than 2,200 lbs.

2. The structural component having a welded joint of claim 1 wherein said adhesive layer is a thermoset adhesive that is one or more selected from the group comprising acrylic adhesives, epoxy adhesives, urethane adhesives and combinations thereof.

3. The structural component having a welded joint of claim 1 wherein a distinct one of said two or more portions is one material selected from the group comprising:
    thermoplastic, thermoset plastics, metal, rubber, wood, glass, fiberglass, and combinations thereof.

4. A structural component forming a tailgate having a welded joint comprising:
    a first portion;
    a first portion of a molded tailgate portion, said first portion having one or more tailgate flanges extending from said first portion and a second portion forming a reinforcement sheet placed across the one or more tailgate flanges;
    at least one weld line created along a surface area between the first portion and the second portion;
    a second portion having a conductor molded onto a surface area of said second portion at a location of said welded joint between said first portion and said second portion;
    an adhesive layer placed on said second portion adjacent to said conductor, wherein a weld line of said welded joint is created by energy being transmitted through said conductor to activate said adhesive layer and create said weld line; and
    wherein a combined structure of the structural component including the first portion, the second portion, the one or more tailgate flanges and the weld line makes the combined structure of the structural component capable of withstanding forces equal to or greater than 2,200 lbs.

5. The structural component having a welded joint of claim 4 wherein said adhesive layer is a thermoset adhesive that is one or more selected from the group comprising acrylic adhesives, epoxy adhesives, urethane adhesives and combinations thereof.

6. The structural component having a welded joint of claim 4 wherein the first portion and the second portion are one material selected from the group comprising:
    thermoplastic, thermoset plastics, metal, rubber, wood, glass, fiberglass, and combinations thereof.

* * * * *